United States Patent [19]
Pielkenrood

[11] 3,972,819
[45] Aug. 3, 1976

[54] COALESCENCE APPARATUS

[75] Inventor: Jacob Pielkenrood, Krommenie, Netherlands

[73] Assignee: Pielkenrood-Vinitex B.V., Assendelft, Netherlands

[22] Filed: Nov. 7, 1974

[21] Appl. No.: 521,573

[52] U.S. Cl. .............................................. 210/513
[51] Int. Cl.$^2$ .......................................... B01D 21/00
[58] Field of Search ............ 210/513, 521, 522, 84; 55/521

[56] References Cited
UNITED STATES PATENTS

| | | | |
|---|---|---|---|
| 386,114 | 7/1988 | Donahue | 210/522 |
| 1,190,863 | 7/1916 | Corne et al. | 210/521 X |
| 1,496,160 | 6/1924 | Marsh | 210/84 |
| 1,864,511 | 6/1932 | Jones | 210/522 X |
| 1,968,614 | 7/1934 | Novotney et al. | 210/84 X |
| 2,193,706 | 3/1940 | Attwood | 210/84 |
| 2,207,399 | 7/1940 | Gaertner | 210/84 X |
| 3,399,770 | 9/1968 | Salomon | 210/84 X |
| 3,490,211 | 1/1970 | Cartier | 55/521 X |
| 3,693,796 | 9/1972 | Michel | 210/84 |
| 3,847,813 | 11/1974 | Castelli | 210/522 |

*Primary Examiner*—Theodore A. Granger
*Attorney, Agent, or Firm*—George F. Smyth

[57] ABSTRACT

An apparatus for bringing about coalescence of particles suspended in a liquid by means of a transverse velocity gradient in the liquid flow in a substantially vertical duct caused by friction against the walls defining said duct, the latter being formed by one or more tube or hose sections, consecutive sections being interconnected by bends, and the cross-section of said duct increasing either gradually or step-wise from the inlet towards the outlet end of said duct.

15 Claims, 6 Drawing Figures

COALESCENCE APPARATUS

In my copending patent application, Ser. No. 353,543, filed Apr. 23, 1973, devices are described for causing coalescence of components suspended in a carrier liquid, which devices comprise a substantially vertical duct extending between an inlet and an outlet, said inlet communicating with a supply for the suspension, said outlet being adapted to be connected to a separation device for separating the coalesced components from the carrier liquid.

In such a device, use is made of the transverse velocity gradient caused by friction against the walls of the duct, as a consequence of which the suspended particles can overtake one another, so that the probability of meeting, and, thus, agglomeration, will be considerably increased.

Such a device generally consists of a basin from which consecutive chambers are separated by means of vertical partitions, and the liquid can pass alternately below and over alternating partitions. In order to prevent the coalesced particles from being disrupted by shearing forces caused by the velocity gradient, the cross-section of consecutive chambers is preferably increased step-wise or gradually in the sense of flow, so that the flow velocity will decrease accordingly. Furthermore, in order to increase the velocity gradient, especially in the initial chambers, often partitions will be arranged in these chambers, which partitions are, in particular, corrugated and, if desired, slidable.

For smaller devices, however, such coalescence apparatus is objectionable, since difficulties can arise when reducing the dimensions. In particular the use of suitable corrugated plates will be difficult as the passages between the crests of adjacent plates and between crests and adjacent walls cannot be maintained at the desired width without difficulties, and, moreover, the velocity in such passages will easily become too high. The manufacturing cost of smaller devices will be unproportionally high.

According to the present invention tubes, and in particular, commercially available tubes with a round cross-section, are used for the coalescence duct, in which a very favorable velocity gradient can be obtained. In this manner it becomes possible to construct a coalescence apparatus which is specifically adapted to smaller separation devices by means of very simple elements.

In addition to commercially available round tubes, and in particular plastic tubes, flexible hoses can also be used. More specifically, the duct thus obtained can comprise of a plurality of partial ducts with alternating flow sense interconnected by bends. It is also possible to coil such a tube or hose helicoidally. Furthermore the consecutive partial ducts can have an increasing diameter, and also a gradually increasing diameter is possible. Moreover several ducts can be interconnected in parallel, in particular by the intermediary of stop of regulating valves.

The velocity gradient can be further increased by providing adapted and in particular slidable cores.

The invention will be elucidated below by reference to the drawing, in which.

Figure 1:
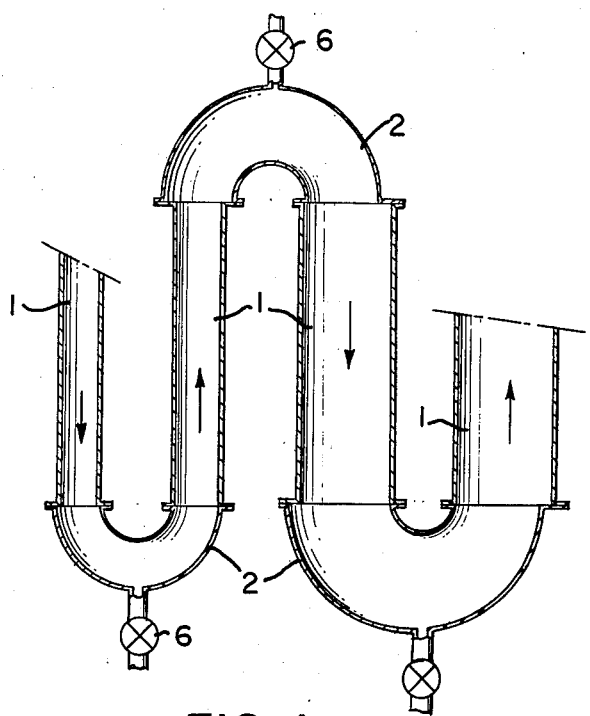
FIG. 1 is a schematic cross-section of a part of an apparatus according to the invention.

In FIG. 1 a part of a coalescence apparatus according to the invention is shown. This apparatus consists of a plurality of substantially vertical tubes 1, which are interconnected by means of bends 2 to form a continuous passage which is connected, on the one hand, to a liquid supply, and, on the other hand, is adapted to be connected to a separation device. Preferably, the liquid will flow in the direction indicated by an arrow through the consecutive tubes.

The friction against the tube walls causes a transverse velocity gradient increasing the probability that the particles suspended in the liquid will overtake one another, and, therefore, the probability that these particles will agglomerate.

In the case shown, the diameter of the consecutive tubes 1 increases, so that the velocity of the liquid and the velocity gradient both decrease, and the probability that already agglomerated particles will be disrupted again by the shearing effect of the liquid flows will decrease accordingly. If this risk does not exist or is negligible, the tubes can all have the same diameter.

Figure 2A:
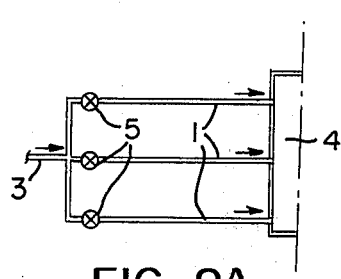
FIGS. 2A and 2B are highly simplified schematic representations of the structure of such an apparatus with branches connected in parallel.
Figure 2B:
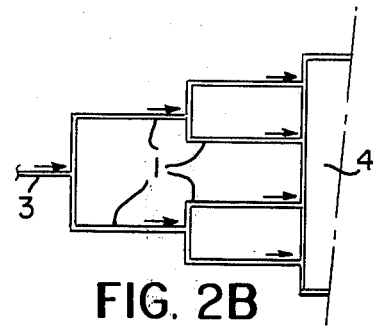

If, at the flow velocity which is favorable for obtaining the desired effect, an insufficient flow rate is obtained, several tubes 1 can be connected in parallel. FIG. 2A shows such an arrangement in which several tubes 1 are connected in parallel between a supply duct 3 and a separation device 4. Stop or regulating valves 5 may be used to vary the number of operative tubes and/or the flow rate therein at will. FIG. 2B shows another solution in which the effect of tubes of increasing diameter is obtained by gradually connecting more tubes with the same diameter in parallel. Also, in this case, stop or regulating valves can be used.

The bends 2 can be provided, if necessary, with drain valves 6 allowing the removal of sediment or gases from the bends.

Instead of rigid tubes, flexible hoses can be used, and then the bends 2 will be superfluous. Also, helicoidally wound tubes or hoses can be used so as to obtain space savings.

Figure 3:
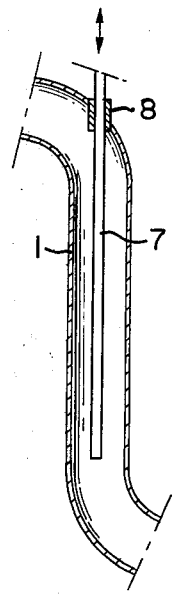
FIG. 3 is a cross-section of a part of such an apparatus with an adjustable core.
Figure 4:
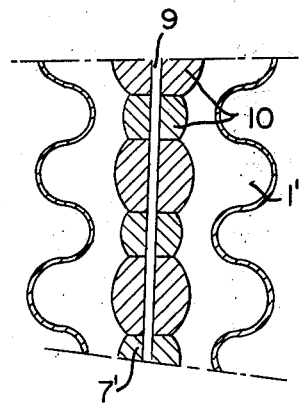
FIG. 4 is a cross-section, corresponding to FIG. 3, of another embodiment.

In order to increase the velocity gradient, a cylindrical core 7 can be arranged, as shown in FIG. 3, in the axis of a tube 1. In particular, this core 7 can be slidably introduced through the wall of the tube so as to enable variation of the length of the core part extending into the tube and, thus, its influence on the flow. If a longitudinal velocity gradient is desired, either the wall of the tube 1 can be corrugated, or a corrugated core can be used, and it is also possible to apply both measures, as shown in FIG. 4. In the latter case a variable phase difference between both corrugations can be obtained by shifting the core 7' in respect of the tube 1', so as to control the velocity gradient accordingly. In this respect reference can be made to the above-mentioned prior patent application in which mutually slidable corrugated plates are described for this purpose. Furthermore it is possible to make the corrugations in the wall and/or the core helicoidal, and in particular the screw sense of the wall corrugations can be made opposite to that of the core corrugations.

A corrugated core 7' can be manufactured as such from plastics, but can also, as shown in FIG. 4, be composed from balls 10 strung on a rod 9, and having, in particular, alternately different diameters. Corrugated tubes can be shaped as such from plastics, but it is also possible to reform straight tubes into this shape, if desired.

Figure 5:
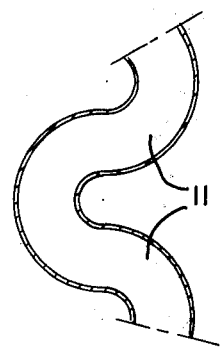
FIG. 5 is a partial section of still another embodiment of the invention.

A different distribution of the velocity differences can be obtained by replacing a tube 1 with an S-bend 11 (FIG. 5), or by bending a hose into this shape. A further embodiment may utilize a tube or hose wound into helicoidal shape, as mentioned above.

Furthermore it is possible to provide a hose with constrictions by means of clamps in order to obtain velocity gradients corresponding to the velocity gradients in the above-mentioned corrugated tubes.

Within the scope of the invention many other modifications are possible.

I claim:

1. In combination with gravitational separation apparatus for the gravitational separation of particles suspended in a fluid;
    fluid conduit means for causing the coalescence of particles suspended in a fluid in said conduit, including
    an inlet end in communication with a source of fluid,
    an outlet end in fluid communication with said separation apparatus for separation of particles in the latter by gravity,
    means for increasing the collision frequency of particles in a fluid within said conduit including
        corrugations in at least one fluid-contacting wall of said conduit for generating velocity gradients in the fluid, and
    means for slowing the velocity of fluid flow in said conduit by increasing the cross-sectional area of said conduit in a direction toward said separator.

2. The apparatus of claim 1 wherein
    said conduit means also comprises
        at least two vertically arranged sections, and
        a U-bend interconnecting said sections.

3. The apparatus of claim 2 wherein
    said at least two sections are of unequal cross-sectional area, with the one of said sections having the greater cross-section area being closer to said outlet end.

4. The apparatus of claim 1 wherein
    said collision frequency increasing means further includes
        longitudinal core means located within said conduit and extending substantially parallel to said at least one fluid-contacting wall of said conduit means.

5. The apparatus of claim 4 wherein
    said longitudinal core means is movably adjustable within said conduit in a direction parallel to the flow of fluid therethrough.

6. The apparatus of claim 1 wherein
    said collision frequency increasing means includes
        axially movable core means located in said conduit means for adjustably altering the fixed surface in said conduit means contacted by a fluid passed through said conduit means.

7. In combination with gravitational separation apparatus for the gravitational separation of particles suspended in a fluid;
    fluid conduit means for causing the coalescence of particles suspended in a fluid in said conduit, including
    an inlet end in communication with a source of fluid,
    an outlet end in fluid communication with said separation apparatus for separation of particles within the latter by gravity,
    means for increasing the collision frequency of particles in a fluid within said conduit including
        longitudinal core means located within said conduit and extending substantially parallel to at least one fluid-contacting wall of said conduit for generating velocity gradients in the fluid, and
    means for slowing the velocity of fluid flow by increasing the cross-sectional area of said conduit in a direction toward said separator.

8. The apparatus of claim 7 wherein
    said collision frequency increasing means further includes
        means for adjustably positioning said longitudinal core within said conduit to vary the velocity gradients generated by said core.

9. The apparatus of claim 7 wherein
    said longitudinal core includes a corrugated surface on the fluid-contacting portion thereof.

10. The apparatus of claim 9 wherein
    said collision frequency increasing means includes
        corrugations in a fluid-contacting wall of said conduit in the proximity of said longitudinal core.

11. The apparatus of claim 10 wherein
    said collision frequency increasing means further includes
        means for adjusting the position for said core means within said conduit to vary the position of a corrugation thereon relative to a corrugation in the fluid-contacting wall of said conduit.

12. In combination with a gravitational separation apparatus for the gravitational separation of particles suspended in a fluid, apparatus for stimulating coalescense of particles in a fluid while prohibiting separation of such coalesced particles until the particles are located in said gravitational separation apparatus comprising
    fluid conduit means for causing the coalescence of particles suspended in a fluid in said conduit and including
    an inlet end in communication with a source of fluid,
    an outlet end in fluid communication with said gravitational separation apparatus for separation in the latter of the coalesced particles therein by gravitational separation,
    means in said conduit between said inlet and outlet ends for generating velocity gradients in a fluid passed through said conduit such that the flow of fluid, at least near said outlet end, is laminar, thereby increasing the collision frequency of particles in a fluid in said conduit, comprising
        at least one substantially 90° corrugation in a fluid-contacting wall of said conduit, and
    means in said conduit between said inlet and outlet ends for slowing the velocity of fluid flow through said conduit by increasing the diameter of said conduit in the direction toward the separator and for thereby reducing turbulence in a fluid in said conduit to reduce the probability of destruction of coalesced particles.

13. In combination with a gravitational separation apparatus for the gravitational separation of particles suspended in a fluid, apparatus for stimulating coalescence of particles in a fluid while prohibiting separation of such coalesced particles until the particles are located in said gravitational separation apparatus comprising fluid conduit means for causing the coalescence of particles suspended in a fluid in said conduit and including
an inlet end in communication with a source of fluid,
an outlet end in fluid communication with said gravitational separation apparatus for separation in the latter of the coalesced particles therein by gravitational separation,
means in said conduit between said inlet and outlet ends for generating velocity gradients in a fluid passed through said conduit such that the flow of fluid, at least near said outlet end, is laminar, thereby increasing the collision frequency of particles in a fluid in said conduit, comprising
at least one core means in said conduit extending substantially parallel to the direction of fluid flow in said conduit,
means in said conduit, between said inlet and outlet ends, for generating velocity gradients in a fluid passed through said conduit by increasing the diameter of said conduit in the direction toward the separator and for thereby reducing turbulence in a fluid in said conduit to reduce the probability of destruction of coalesced particles.

14. The apparatus of claim 13 wherein
said velocity gradient generating means further comprises
means comprising at least one substantially 90° corrugation in the fluid-contacting wall of said conduit to generate longitudinal velocity gradients in a fluid passed through said conduit.

15. The apparatus of claim 14 wherein
said at least one core means includes at least one corrugation on the fluid-contacting surface thereof in the proximity of said corrugation on said conduit wall and includes
means for adjustably locating said at least one corrugation on said core means relative to said at least one corrugation on said conduit wall.

* * * * *